United States Patent [19]
Chateau et al.

[11] Patent Number: 5,307,472
[45] Date of Patent: Apr. 26, 1994

[54] DATA TRANSFER INTERFACE MODULE

[75] Inventors: Alain Chateau, Herblay; Emmanuel Rousseau, Paris, both of France

[73] Assignee: Alcatel Radiotelephone, Paris, France

[21] Appl. No.: 724,629

[22] Filed: Jul. 2, 1991

[30] Foreign Application Priority Data

Jul. 2, 1990 [FR] France .................. 90 08338

[51] Int. Cl.$^5$ .......................................... G06F 12/02
[52] U.S. Cl. ................... 395/425; 264/DIG. 1;
   264/238.8; 264/239.7; 264/251.1; 264/251.3
[58] Field of Search ... 364/200 MS File, 900 MS File;
   395/400, 425; 371/21.1, 21.5, 57.2

[56] References Cited

U.S. PATENT DOCUMENTS

| | | | |
|---|---|---|---|
| 4,458,314 | 7/1984 | Grimes | 395/325 |
| 5,079,694 | 1/1992 | Nakagawa et al. | 395/425 |
| 5,134,562 | 7/1992 | Hattori et al. | 395/400 |

FOREIGN PATENT DOCUMENTS

| | | | |
|---|---|---|---|
| 0205112 | 12/1986 | European Pat. Off. | G06F 9/40 |
| 4-83439(A) | 3/1992 | Japan . | |
| 8201429 | 4/1982 | World Int. Prop. O. | G06F 9/00 |

*Primary Examiner*—Joseph L. Dixon
*Assistant Examiner*—Hiep T. Nguyen
*Attorney, Agent, or Firm*—Sughrue, Mion, Zinn, Macpeak & Seas

[57] ABSTRACT

A data transfer interface module comprises a storage zone constituted by a plurality of locations referenced by addresses provided by an address generator and serving to acquire a set of data items constituting a block of a size that may be variable, which data items are stored successively in the plurality locations; a control signal COM via control circuit and an acquisition and recording circuit to enable address generation and also loading in the storage zone, the same control circuit in association with a read and transmission circuit then enabling the data to be transmitted, with the data items being extracted one by one from the locations, such that the first item to be transmitted is the last item to have been recorded; and a monitor circuit controlled by the address generator and serving to verify that the number Do of data items transmitted is equal to the number Di of data items acquired and to provide a status word ST which can be read to provide information about proper transmission.

3 Claims, 2 Drawing Sheets

DATA TRANSFER INTERFACE MODULE

The invention relates to a data transfer interface module for transferring data from a first circuit to a second circuit. The interface module includes means required for acquiring and storing data coming from the first circuit, for reading and transmitting said data to the second circuit, and for controlling and monitoring the transfer of said data.

BACKGROUND OF THE INVENTION

Several types of interface module providing a connection between a first circuit and a second circuit are known. Said modules include a data storage zone constituted by registers or by a memory having various addresses provided by the first circuit during a data acquisition stage and by the second circuit during a data transmission stage. An address multiplexer makes such alternating addressing by the first and second circuits possible. Nevertheless, said module suffers from the drawback of requiring a number of input connections and a number of output connections that is not less than the set of all the address signals issued by the first and second circuits.

It is also known that the provision of address signals by the first circuit and by the second circuit can be omitted by using a first-in first-out (FIFO) structure for the storage zone, in which case management of the storage zone becomes more complex.

It is also known, in particular from patent application No. WO-A-82 01429, corresponding to U.S. Pat. No. 4,394,729, that a last-in first-out (LIFO) structure can be used for this storage zone. However, means are not provided for monitoring and verifying that the number of data items read from the storage zone corresponds to the number of data items previously recorded therein.

The present invention as defined in the accompanying claims solves the problem of creating a data transfer interface module without requiring complex management of the storage zone, without requiring addressing signals to be received from the first and second circuits, and also making it possible to monitor proper operation of data transfer.

SUMMARY OF THE INVENTION

The present invention provides a data transfer interface module comprising: data acquisition means, means for storing the acquired data in a storage zone comprising locations identified by respective addresses delivered by an address generator, means for reading said data from the locations in said storage zone, means for transmitting said data, control means suitable during successive acquisition and transmission phases for acquiring and storing data in a determined number of locations, then for reading and transmitting said data, said address generator generating an incrementing sequence of addresses from a starting address to an end address for use during said acquisition stage, and then generating a decrementing sequence of addresses from said end address to said starting address for use during said transmission stage, wherein the module also includes monitor means for verifying that said address generator returns to said starting address after one of said acquisition stages and one of said transmission stages have succeeded each other, and which then generates a status word.

This self-contained generation of addresses serves to reduce the number of interchanges and to simplify management of the storage zone because the address generator proceeds by successive incrementation and decrementation from its starting position. The physical area required for receiving the various components of such a module is thus small and the overall manufacturing cost of the interface module is reduced.

Since monitoring is limited to observing the origin position of the address generator, the logic circuitry which performs it is simple as is undertaking said monitoring which consists merely in reading the status word.

BRIEF DESCRIPTION OF THE DRAWINGS

An embodiment of the invention is described by way of example with reference to the accompanying drawings, in which.

DETAILED DESCRIPTION

Figure 1:
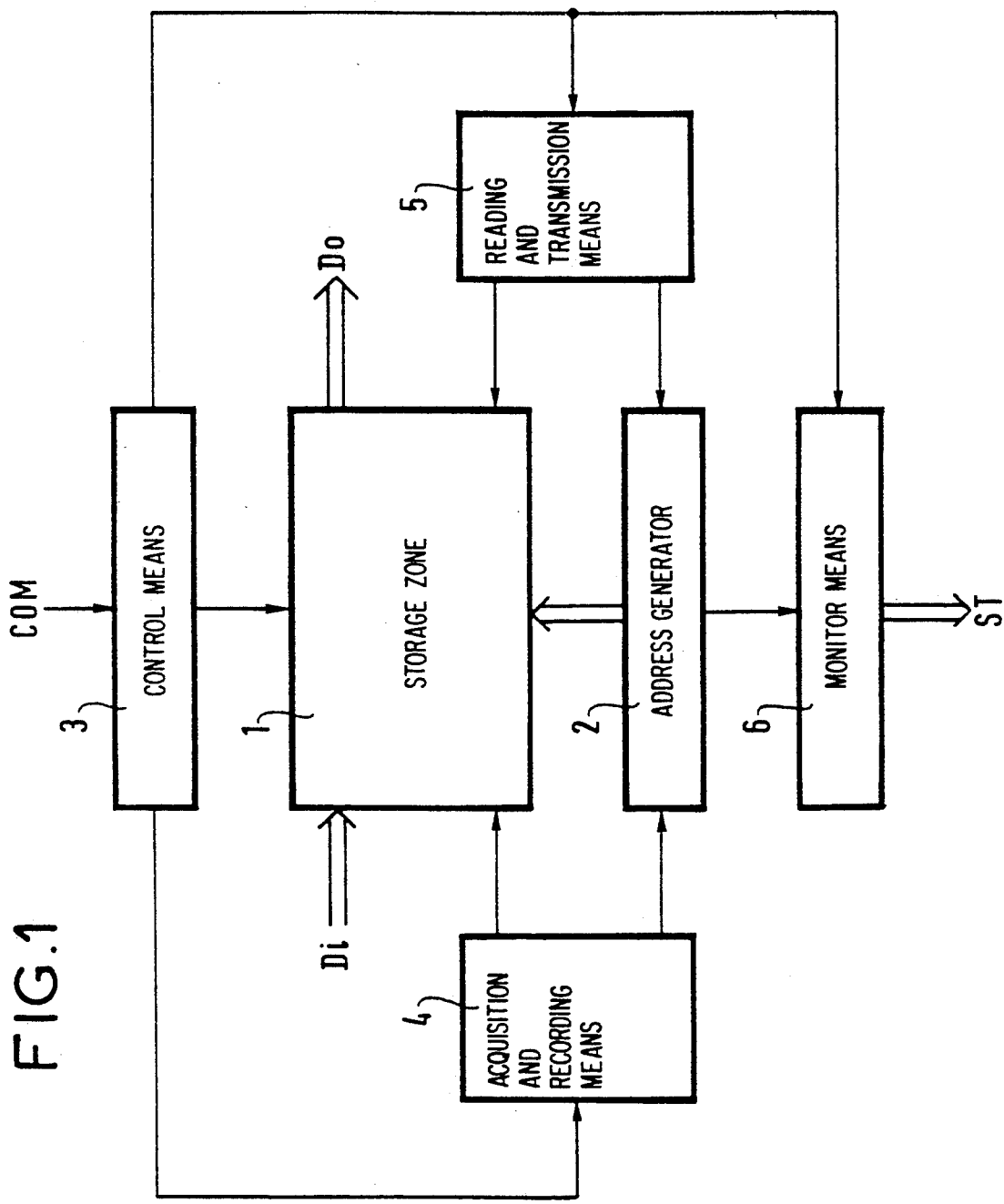
FIG. 1 is a block diagram of a data transfer interface module.

FIG. 1 is a general block diagram of a data transfer interface module of the invention. A storage zone 1 constituted by various locations referenced by respective addresses delivered by an address generator 2 acquires data in blocks that may be variable in size, which data is then stored sequentially in said locations. Control means 3 receive a control signal COM to enable writing or reading in the storage zone 1. The control means also authorize address generation and loading via acquisition and recording means 4. The same control means 3 are associated with reading and transmission means 5 for subsequently enabling said data to be transmitted by being extracted from said locations one by one, with the first data item to be transmitted being the last to have been stored. Monitoring means 6 responsive to the address generator 2 serve to verify that the number Do of data items transmitted is equal to the number Di of data items acquired and to provide a status word ST which, on being read, provides information concerning proper operation of transmission.

The equipment operates in three stages: an initialization stage during which the address generator 2, the control means 3, the acquisition and recording means 4, the reading and transmission means 5, and the monitor means 6 are initialized and in which the storage zone 1 is deactivated; an acquisition stage during which data is acquired and stored in said storage zone 1; and a transmission stage during which the same data is extracted from said storage zone 1 and is transmitted.

Figure 2:
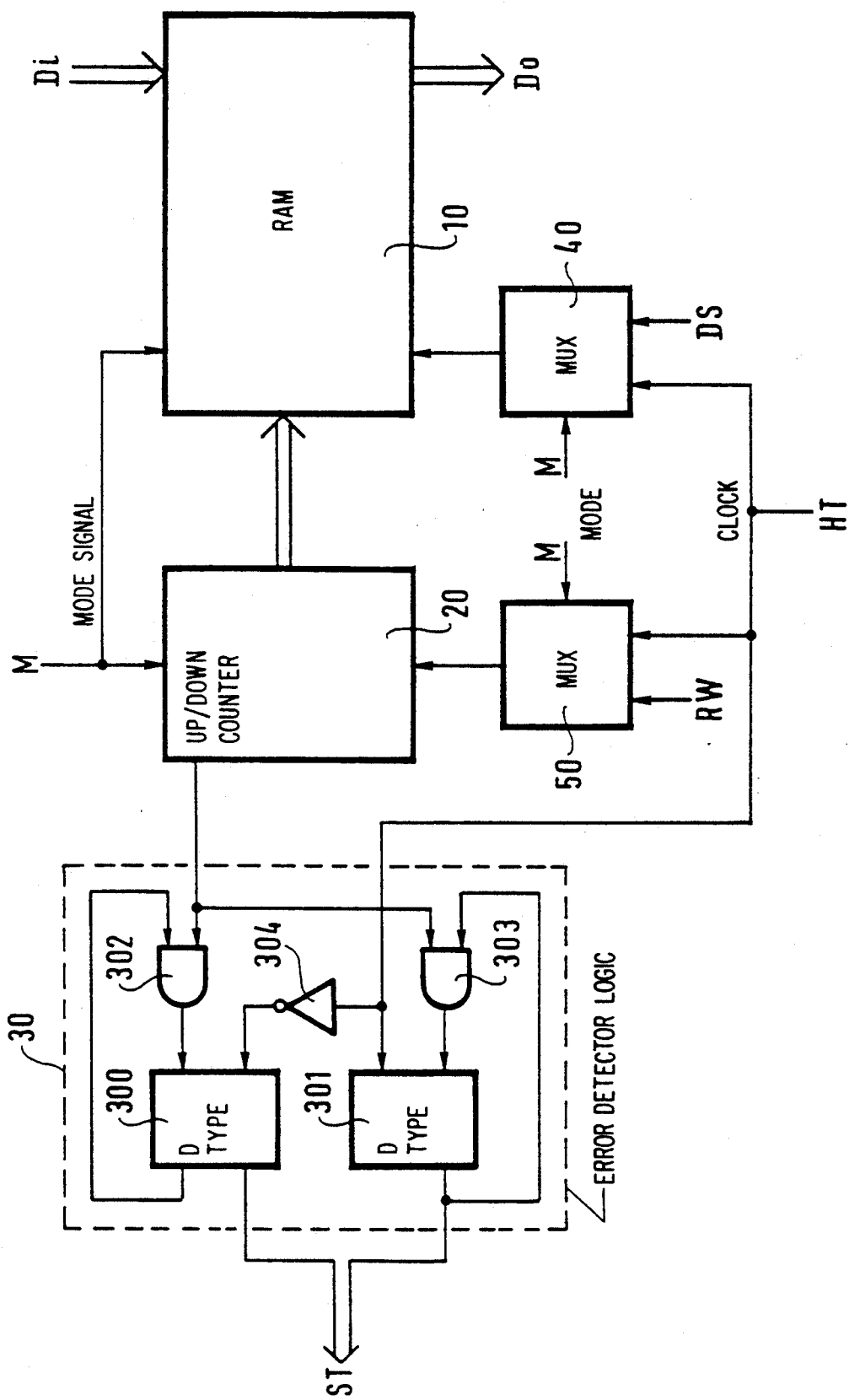
FIG. 2 shows one embodiment of such a module.

In an embodiment as shown in FIG. 2, a data transfer interface module essentially comprises a random access memory (RAM) 10 associated with an up/down counter 20, and with error detection logic 30 for monitoring the equipment.

The memory 10 is configured for writing during said acquisition stage, or for reading during said transmission stage, depending on the level of its read/write input as determined by the value of a mode signal M derived from the control signal COM.

Data is written to said locations sequentially by successively selecting the memory 10 via a first synchronization signal DS of the chip-select or data-strobe type derived from the control signal COM. The data items are stored at increasing addresses in the range 1 to A where A is the total number of data items written. Data is read symmetrically with data being read from decreasing addresses in the range A to 1 by the memory 10 being selected successively via a transfer clock signal HT derived from the control signal COM. In the absence of this clock signal, the module is in a waiting stage ready to transmit the data that is has previously stored.

Write or read selection is performed by changing the level at the select input of the memory 10 which receives the mode signal M. A first multiplexer circuit 40 receives both said first synchronization signal DS and said transfer clock HT, with selection of one or other of these two signals depending on the level of the mode signal M.

The up/down counter 20 is set to count up during said acquisition stage, or else to count down during said transmission stage, depending on the level applied to its up/down input as determined by said mode signal M.

When counting up, said up/down counter 20 delivers said increasing sequence of addresses in the range 'to A at the rate of a second read/write type synchronization signal RW derived from the control signal COM. At the end of counting up, the value of the counter is equal to the number Di of data items acquired. While it counts down, said up/down counter 20 delivers said decreasing sequence of addresses in the range A to 1 at the rate determined by said transfer clock HT. Counting up or down is achieved by changing the level at the clock input of the up/down counter 20 via a second multiplexer circuit 50 which receives both said transfer clock signal HT and said second synchronization signal RW, with one or other of these signals being selected under the control of said mode signal M.

When it has finished counting down, the state of the counter should be 0 and its carry signal should be 1. Operation of the up/down counter 20 and of the memory 10 does not require knowledge of the number of data items to be transmitted given that this number is present in the counter at the end of memory loading.

It suffices merely to provide a memory having a number of locations that is greater than the maximum number A of data items to be acquired and to observe that these data items are required to appear in the reverse order to the order in which they are subsequently to be transmitted. The clocking provided by said transfer clock HT may be at a variable rate, with switching from one stage to another taking place in response to said mode signal M only after each stage has been completed.

The error detection logic 30 verifies that the number Do of data items transmitted under clocking from said transfer clock HT is equal to the number Di of data items acquired and stored in said locations of the memory 10. After a complete acquisition-transmission cycle, said carry signal of the up/down counter should be equal to 1 if the number Do of data items transmitted is correct, with the carry signal being initialized to 0 during said initialization stage. Rather than testing said carry signal directly, it is preferable to detect occurrences of various different edges, since the various combinations obtained in this way provide a better estimate of proper performance of data transmission. The status word ST which is then delivered is particularly meaningful. Rising and falling edges in the carry signal are detected by means of two D-type bistables 300 and 301 which are initialized to 0 and which are loaded with 1 respectively after a rising edge and after a falling edge. The non-inverting output of each bistable is looped back to the corresponding input via respective AND gates 302 and 303, thereby ensuring that said outputs are stored. The clock inputs to the bistables are constituted in one case by the transfer clock HT and in the other case by the inverted transfer clock via NOT gate 304. The various combinations of the output states of said bistables 301 and 302 determine said status word ST and enable data transmission to be evaluated. If neither of said edges is detected, then insufficient data has been read, if both a rising edge and a falling edge are detected in succession, then too high a number of data items have been read, whereas if a single rising front is detected then all of the acquired and stored data has been read properly.

The invention is not limited to the particular embodiment described above, and the person skilled in the art can readily devise other embodiments and can also readily ensure that the various above-mentioned circuits are properly initialized.

We claim:

1. A data transfer interface module comprising: data acquisition means, means for storing the acquired data in a storage zone at locations identified by respective addresses delivered by an address generator, means for reading said data from the locations in said storage zone, means for transmitting said data, control means which, during successive acquisition and transmission phase acquires and stores data in a determined number of locations, then reads and transmits said data, said address generator generating an incrementing sequence of addresses from a starting address to an end address during said acquisition stage, and then generating a decrementing sequence of addresses from said end address to said starting address during said transmission stage, wherein the module also includes monitor means for verifying that said address generator returns to said starting address after one of said acquisition stages and one of said transmission stages have succeeded each other, and which then generates a status word indicating the result of the verification.

2. A data transfer interface module according to claim 1, wherein said address generator is constituted by an up/down counter which receives the same number of clock pulses during said acquisition stage for incrementation purposes and then during said transmission stage for decrementation purposes as the number of data items to be transferred.

3. A data transfer module according to claim 1, wherein said monitor means comprise an error detection logic circuit constituted by two D-type bistables controlled by the clock pulses issued during said transmission stage, with the non-inverting output of each bistable being looped back to its input which also receives the carry signal of the up/down counter to deliver one bit of said status word.

* * * * *